Inventor
Harry W. Brown
By Wm. A. Auter
Attorney

July 20, 1965  H. W. BROWN  3,196,220
THREE POSITION ELECTRIC SWITCH WITH ALIGNED
CONTACT BEARING SURFACES
Filed Aug. 22, 1961  6 Sheets-Sheet 3

Inventor
Harry W. Brown
By Wm. A. Curtis
Attorney

July 20, 1965  H. W. BROWN  3,196,220
THREE POSITION ELECTRIC SWITCH WITH ALIGNED
CONTACT BEARING SURFACES
Filed Aug. 22, 1961  6 Sheets-Sheet 5

Inventor
Harry W. Brown
By Wm. A. Autio
Attorney

United States Patent Office 3,196,220
Patented July 20, 1965

3,196,220
THREE POSITION ELECTRIC SWITCH WITH
ALIGNED CONTACT BEARING SURFACES
Harry W. Brown, Mukwonago, Wis., assignor to Cutler-
Hammer, Inc., Milwaukee, Wis., a corporation of
Delaware
Filed Aug. 22, 1961, Ser. No. 133,107
4 Claims. (Cl. 200—6)

This invention relates to improvements in electric switches and particularly, to single pole alternating current controlling switches for effecting sequential or simultaneous switch functions.

There is a need for a single pole alternating current switch capable of controlling two independent loads in a sequential or simultaneous relation. This is particularly important in the air conditioning field, where a fan would be turned on alone and then the compressor or a fan and compressor would be turned on simultaneously, but the compressor could never be turned on alone. Also in the movie or slide projector field where circuits are often desired to turn on the projector fan alone, then the projector light or the fan and projector light together, but never the projector light alone. In each instance the switching requirement is necessary in order to safeguard the life of the system.

The primary object of this invention is to provide an alternating current switch for effecting sequential or simultaneous switch functions.

This object is accomplished by mounting a pole member in a housing to rock on a common contact so that it electrically engages only the common contact when in an off center or neutral position. A toggle or rocker type operator is used to rock the pole from the off center position into electrical engagement with fixed contacts in the housing. The pole may be a single or double unit and is closed with the fixed contacts to effect a sequential closing with the contacts. When a double pole member is used, simultaneous closing of the pole with the contacts can be effected by a single movement of the pole member.

Other objects and advantages will be pointed out in, or be apparent from, the specification and claims, as will obvious modifications of the three embodiments shown in the drawings, in which:

Figure 1:
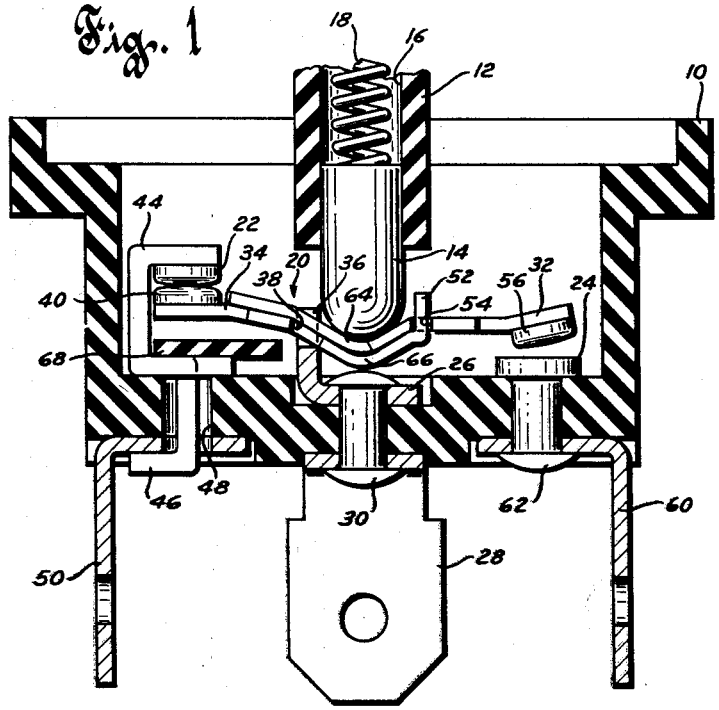
FIGURE 1 is a side view of the switch in section with one contact closed.
Figure 2:
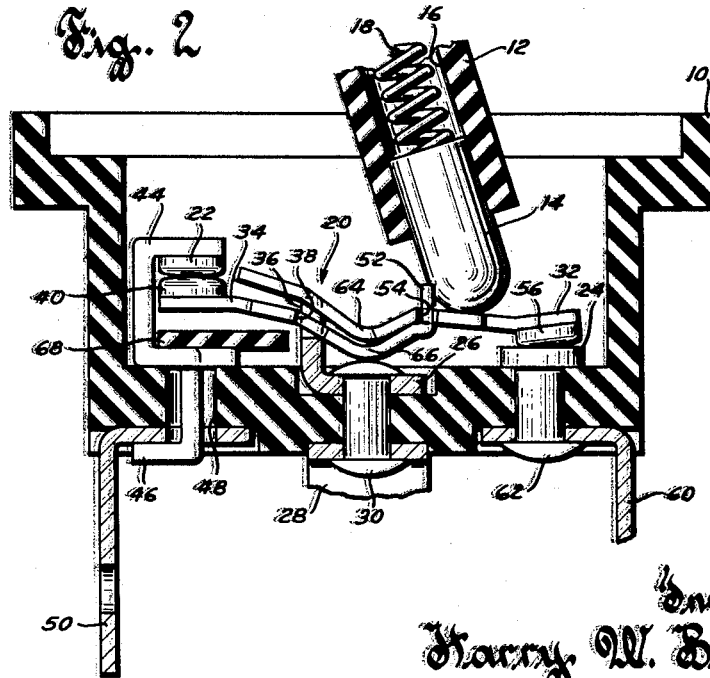
FIG. 2 is a side view similar to FIG. 1 with both contacts closed.

Referring to the drawings in detail, specifically FIGS. 1 through 5, a sequential operating switch having an insulating base 10 is shown with a toggle type rocker switch 12 (partially shown) mounted for reciprocal motion above it. A plunger 14 is positioned within a recess 16 in the rocker switch and is biased by a compression spring 18 into engagement with a two piece pole 20. The rocker switch is rotated back and forth with respect to the base to rock the pole into and out of engagement with contacts 22 and 24.

The pole is mounted for rocking motion on an L-shaped bridge member 26 which is secured to spade terminal 28 by rivet 30. The pole is divided into an upper contactor 32 and a lower contactor 34 mounted in an overlapped relation on the bridge member. The lower contactor is punched and stamped from a strip of sheet metal and mounted to rock on the vertical portion of the bridge with tabs 36 aligned with notches 38 on either side of the contactor to hold the lower contactor on the bridge. A contact disc 40 is secured to one end of the lower contactor for engagement with stationary contact 22 which is mounted on the inside surface of a U-shaped member 44. The U-shaped member has a finger 46 which projects through an opening 48 in the base and is bent to hold a spade terminal 50 and provide an electrical connection between the terminal and the stationary contact.

The upper contactor overlaps a portion of the lower contactor and is mounted to pivot on the end of the lower contactor with tabs 52 being bent upward from the lower contactor to engage notches 54 on either side of the upper contactor to hold the upper contactor in position. A contact disc 56 is secured to the under surface of the contactor to engage stationary contact 24 which is secured to spade terminal 60 by rivet 62.

Figure 3:
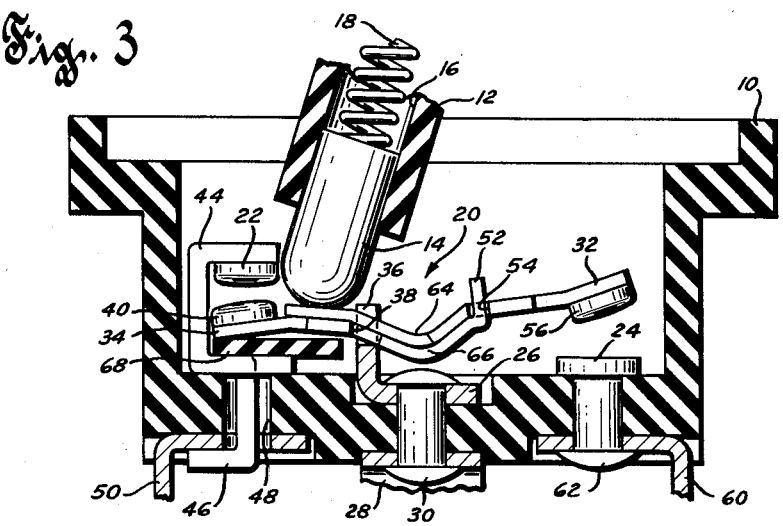
FIG. 3 is a side view similar to FIG. 1 with both contacts open.
Figure 5:
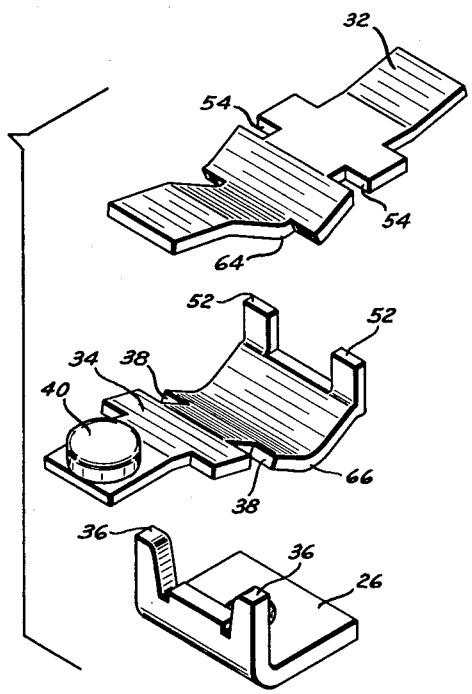
FIG. 5 is an exploded view of the bridge and contactors.
Figure 4:
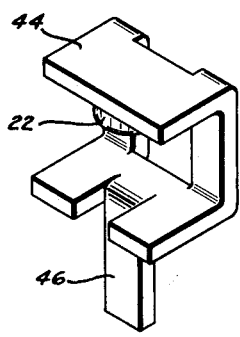
FIG. 4 is a perspective view of one of the stationary contacts.

The upper contactor has a concave portion 64 which fits into a similar concave portion 66 in the lower contactor so that the two contactors rock as a unit in the "off" and "single contact" engagement positions. As seen in FIG. 3, in the "off" position, the contact discs are disengaged from the contacts with the lower contactor resting on insulator 68 and the plunger is moved to the extreme left. Counterclockwise rotation of the plunger to a vertical position will rock the contactors on the vertical portion of the L-shaped bridge member bringing the contact disc 40 into engagement with stationary contact 22 and completing a circuit from spade terminal 28 to spade terminal 50. The plunger will seat within the concave portion 64 of the upper contactor. Further rotation of the plunger to the extreme right (FIG. 2) will rotate the upper contactor about the end of the lower contactor until contact disc 56 engages stationary contact 24. A circuit then will be completed from terminal 28 to terminal 60. This arrangement thus provides for sequential closing of the switches with a single switch actuator.

Figure 6:
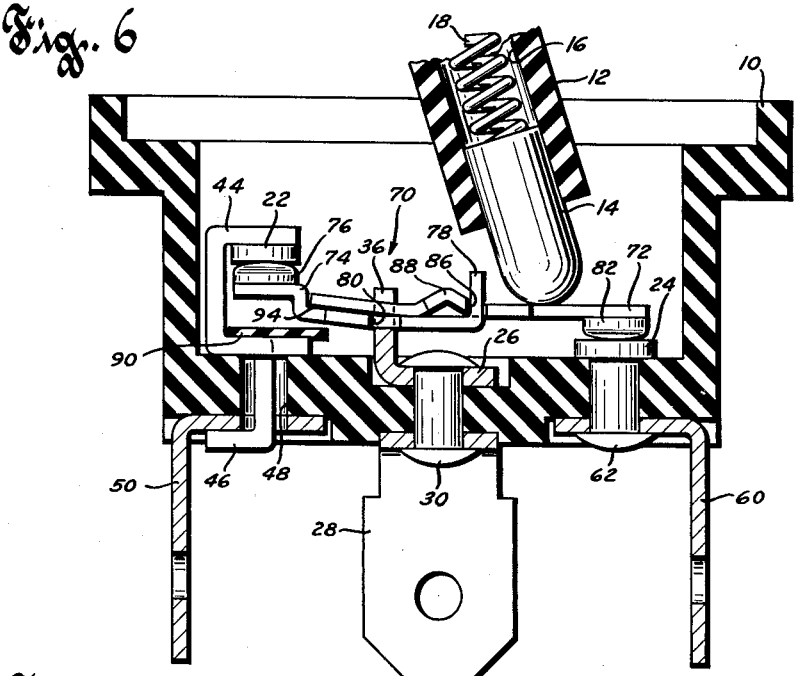
FIG. 6 is a side view of a modified type switch for simultaneous closing of two switch contacts.
Figure 7:
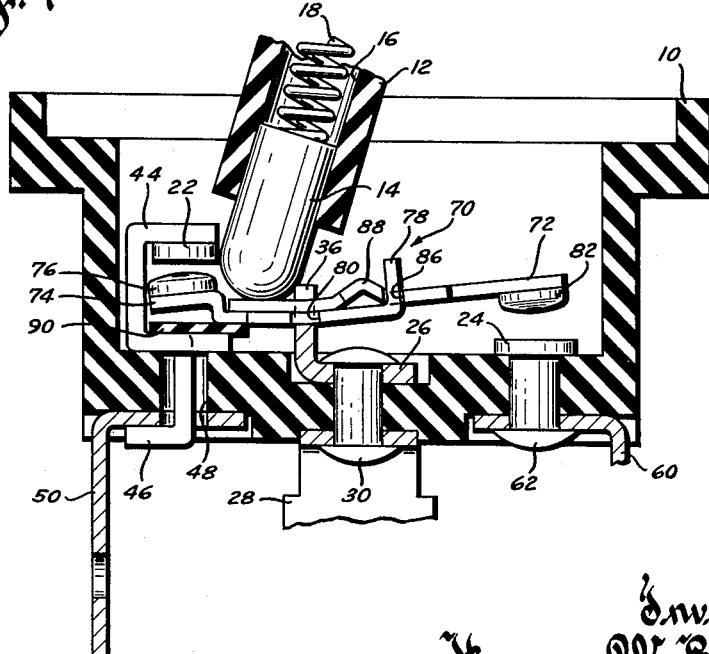
FIG. 7 is a side view similar to FIG. 6 with both switch contacts open.
Figure 8:
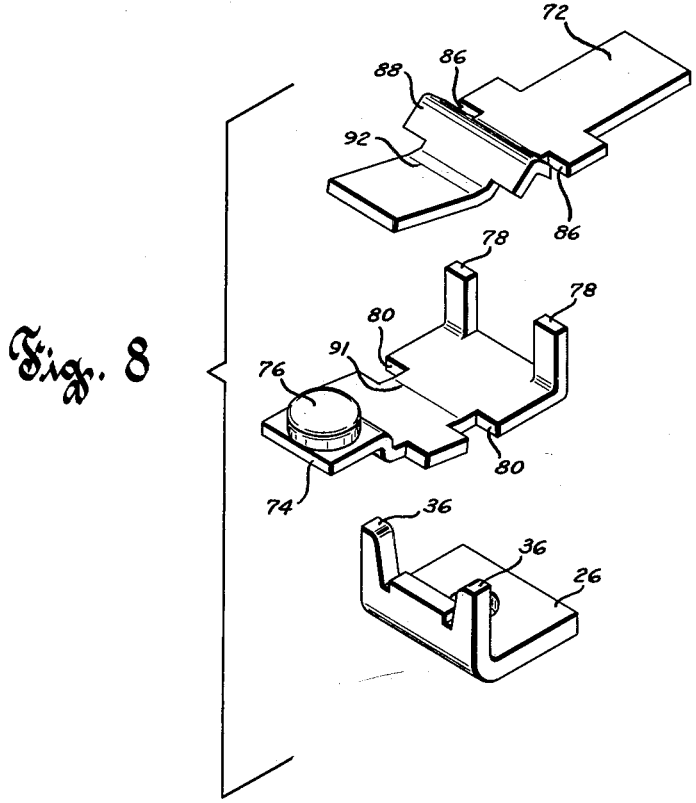
FIG. 8 is an exploded view of the contactors for the modified switch.
Figure 9:
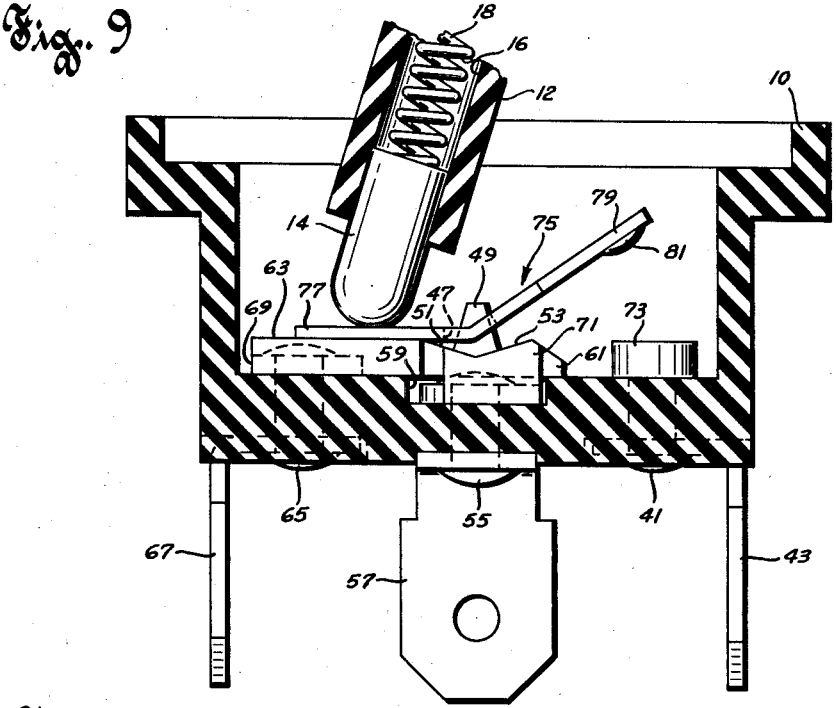
FIG. 9 is a side view of a second modification in which a single pole member is used to sequentially actuate the switches.
Figure 10:
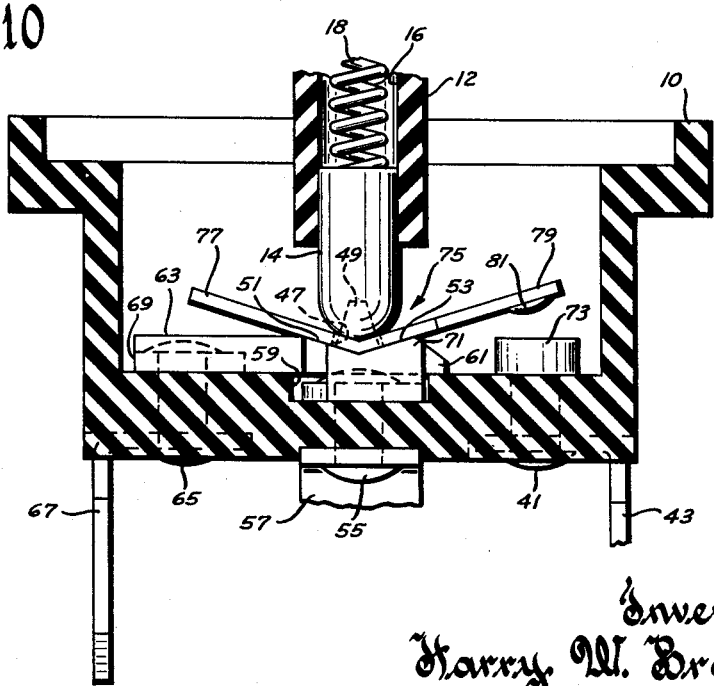
FIG. 10 is a view similar to FIG. 9 with one contact closed.
Figure 11:
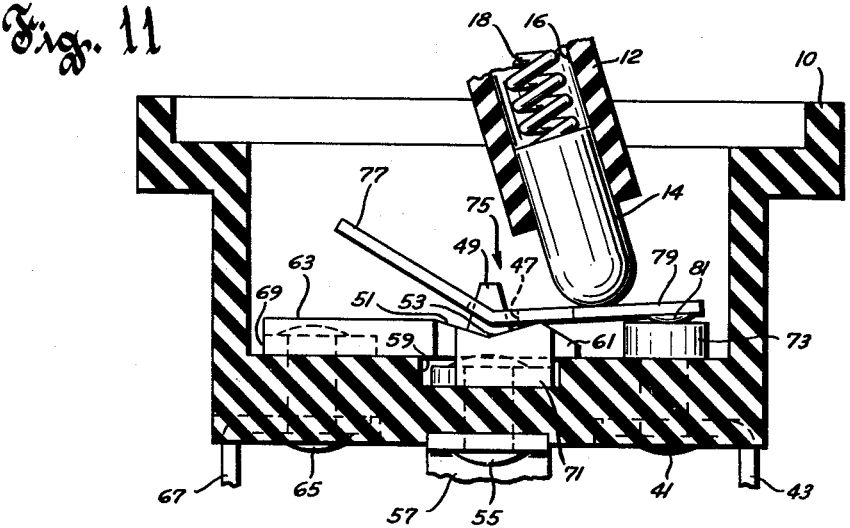
FIG. 11 is a view similar to FIG. 9 with both contacts closed.
Figure 12:
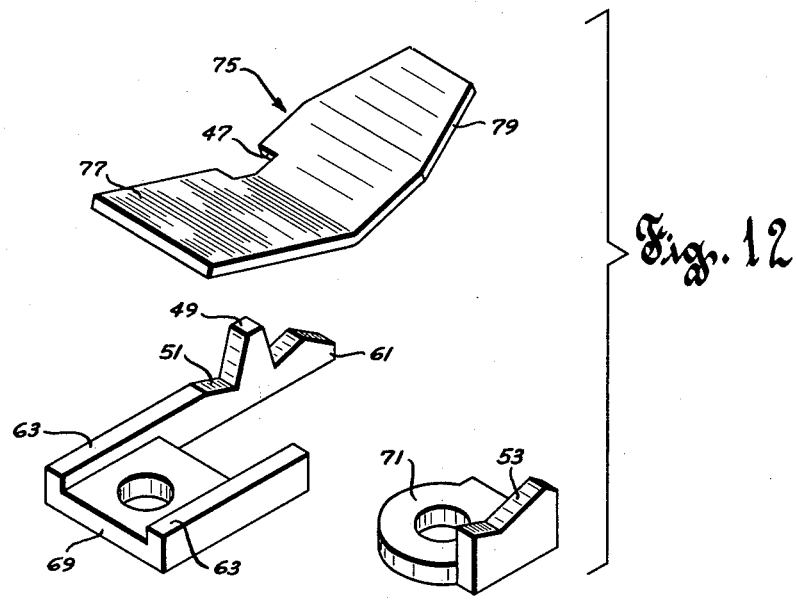
FIG. 12 is an exploded view of the switch blade and first contact.

In FIGS. 6, 7 and 8 the pole member 70 has been modified to effect a simultaneous closing of the two circuits with the same base and stationary contact structure as numbered above. The pole member is divided into an upper contactor 72 and a lower contactor 74 mounted to rock on the L-shaped bridge 26. The lower contactor has a contact disc 76 secured to one end of the contactor and a pair of tabs 78 bent upward at the other end. Notches 80 are provided on either side of the contactor for alignment with tabs 36 on the bridge. The upper contactor has a contact disc 82 secured to one end and notches 86 for alignment with tabs 78 on the lower contactor. An inverted "V" section 88 is stamped into the upper contactor to provide a positive detent action on plunger 14 when moving the switch from an "on" to an "off" position. In the "off" position, the lower contactor will rest against an insulating block 90 mounted on the U-shaped contact. Rotation of the plunger from the left to the right will depress the plunger into the recess as it rides over the "V" section 88 building up a compressive force in spring 18. Pressing the plunger over the "V" section will snap the pole contacts 76 and 82 into engagement with the stationary contacts 22 and 24. Thus a rapid and positive switch action is accomplished in a small movement of the plunger. As seen in FIG. 8, the lower contactor is bent approximately six degrees upward from a line 91. The upper contactor is also bent approximately six degrees upward from a line 92. When the upper contactor is placed on the lower contactor, a small gap 94 will open up between the contactors when the actuator is in the position shown in FIG. 6. Any wear which may occur between the contactors will be compensated for by the gap 94 assuring a longer operating life for the switch. This is accomplished due to the two piece pole member and the displacing of the pivot point for the upper contactor to a point between the pivot for the lower contactor and the point of application of force from the actuator. The lower contactor will thus be free to rock about the bridge until it engages contact 22 or until it engages the bent portion of the upper contactor.

In FIGS. 9 through 12 a modified switch is shown in which a single rocker blade 75 is used to effect a sequential closing with first and second contacts 71 and 73. The base structure and the rocker switch are the same as above. The blade is bent at its center to form a flat section 77 and a tapered section 79, the latter of which carries a contact disc 81. A common contact 69 is secured to spade terminal 67 by rivet 65. The common contact is provided with parallel flanges 63, one of which has an extension 61 having a "V" section 51. A vertical projection 49 is centrally located in the "V" section for alignment with a notch 47 in the blade. When the blade is held in the open position (FIG. 9), the flat section will rest solely on the flanges of the common contact.

The first contact is secured to spade terminal 57 by rivet 55 and has an upstanding "V" section 53 which is positioned opposite "V" section 51 to form a rocking surface for the blade. The first contact is positioned in a notch 59 so that the upper portion of the "V" section is lower than the upper surface of the flanges and will not engage the blade when it is held in the open position. When the blade is rocked to the central position (FIG. 10), the bend in the blade will rest on the two "V" sections, completing a circuit from the common contact through the blade to the first contact.

The second contact is secured to spade terminal 43 by rivet 41 and is positioned to engage the contact disc on the tapered section of the blade. When the blade is rocked into engagement with the second contact (FIG. 11), the contact disc will rest on the second contact and on the "V" sections 51 and 53. A circuit will then be completed from the common contact through the blade to both the first and second contacts.

Although but three embodiments of the present invention have been illustrated and described, it will be apparent to those skilled in the art that various changes and modifications may be made therein without departing from the spirit of the invention or from the scope of the appended claims.

I claim:

1. In an electric switch, in combination, an insulating base, means for completing and interrupting circuits comprising a common contact secured to said base, first and second contacts secured to said base and spaced from said common contact and each other, said common and said first contacts each having bearing surfaces which are in spaced apart, alined relation with those of the other, and a contactor longitudinally rockable onto said bearing surfaces from a non-circuit completing position in contact with said common contact only to a first circuit completing position in engagement with said common and said first contacts, said contactor being further longitudinally rockable on said bearing surfaces from said first circuit completing position to a second circuit completing position in engagement with all three of said contacts.

2. A switch according to claim 1, wherein said contactor is V-shaped and said common and first contact bearing surfaces are V-shaped.

3. A switch according to claim 2, wherein said contactor and common contact have complemental interfitting portions restricting said contactor against any substantial longitudinal movement in said switch as it rocks as aforestated.

4. A switch according to claim 1, wherein said common contact has transversely spaced coplanar surfaces which are engaged by said contactor in its inoperative position and wherein the bearing surface of said common contact is integral with and an extension of one of said coplanar surfaces.

References Cited by the Examiner

UNITED STATES PATENTS

| | | | |
|---|---|---|---|
| 2,085,217 | 6/37 | Hart | 200—68 |
| 2,203,555 | 6/40 | Von Hoorn. | |
| 2,927,983 | 3/60 | Brown | 200—67 |
| 2,936,347 | 5/60 | Larkin | 200—67 X |
| 3,022,394 | 2/62 | Grotz | 200—68 |
| 3,031,547 | 4/62 | Sorenson | 200—67 |
| 3,117,197 | 1/64 | Carling et al. | 200—67 |

ROBERT K. SCHAEFER, *Acting Primary Examiner.*

BERNARD A. GILHEANY, *Examiner.*